US011420561B2

(12) United States Patent
Jeon

(10) Patent No.: US 11,420,561 B2
(45) Date of Patent: Aug. 23, 2022

(54) LATERAL IMAGE PROCESSING APPARATUS AND METHOD OF MIRRORLESS CAR

(71) Applicant: Hyundai Mobis Co., Ltd., Seoul (KR)

(72) Inventor: Seung Heon Jeon, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 472 days.

(21) Appl. No.: 16/503,900

(22) Filed: Jul. 5, 2019

(65) Prior Publication Data
US 2020/0010016 A1 Jan. 9, 2020

(30) Foreign Application Priority Data
Jul. 6, 2018 (KR) .................. 10-2018-0078820

(51) Int. Cl.
*B60R 1/00* (2022.01)
(52) U.S. Cl.
CPC .......... *B60R 1/00* (2013.01); *B60R 2300/306* (2013.01); *B60R 2300/8046* (2013.01)
(58) Field of Classification Search
CPC ............... B60R 1/00; B60R 2300/306; B60R 2300/8046; B60R 2300/307; B60R 2300/30; B60R 2300/8066; B60R 2300/202; B60R 2300/205; B60R 2300/00

USPC ........................................................ 348/148
See application file for complete search history.

(56) References Cited

U.S. PATENT DOCUMENTS

| | | | |
|---|---|---|---|
| 2006/0274147 A1* | 12/2006 | Chinomi ............... | G06T 3/4038 348/118 |
| 2012/0320212 A1* | 12/2012 | Aimura .................... | B60R 1/00 348/148 |
| 2013/0004021 A1* | 1/2013 | Nagaoka ................ | G08G 1/163 382/103 |
| 2013/0271608 A1* | 10/2013 | Hiei ......................... | H04N 7/18 348/148 |
| 2017/0318267 A1 | 11/2017 | Kim et al. | |

FOREIGN PATENT DOCUMENTS

KR 10-2017-0124212 11/2017

* cited by examiner

*Primary Examiner* — Nathnael Aynalem
(74) *Attorney, Agent, or Firm* — H.C. Park & Associates, PLC

(57) ABSTRACT

The present invention relates to a lateral image processing method, and the method includes recognizing areas in which amounts of image change are different from each other in an image captured by a camera; determining whether a car is in a driving state; and converting an image in one area in which an amount of image change is different according to the driving state of the car.

16 Claims, 5 Drawing Sheets

LATERAL IMAGE PROCESSING APPARATUS AND METHOD OF MIRRORLESS CAR

CROSS-REFERENCE TO RELATED APPLICATION

This application claims priority from and the benefit of Korean Patent Application No. 2018-0078820, filed on Jul. 6, 2018, which is hereby incorporated by reference for all purposes as if set forth herein.

BACKGROUND

Field

Exemplary embodiments relates to a lateral image processing apparatus and method of a mirrorless car, and more specifically, to an image processing apparatus and method of easily recognizing a car in a short time period even with a display apparatus having a limited size by enhancing clarity of the car in an image captured by a camera.

Discussion of the Background

In a car technology, desires for a technology for self-driving, a technology for improving fuel efficiency of a car, and car design are increased.

In order to meet such desires, mirrorless cars in which cameras and display apparatuses are substituted for car side mirrors are developed, and laws and regulations for the mirrorless cars, which do not include side mirrors, of each country are being revised.

Such a mirrorless car displays an image received from a camera on a display apparatus, but there is a problem in that it is not easy to recognize an object in the displayed image due to a limited size of the display apparatus.

In addition, in a case in which an image received from a camera is generally dark or bright, or is partially bright or dark, a conventional mirrorless car has a problem in that risk of an accident is increased because it is difficult to recognize an object due to light and dark distribution in the image.

The above information disclosed in this Background section is only for enhancement of understanding of the background of the invention and, therefore, it may contain information that does not constitute prior art.

SUMMARY

Exemplary embodiments of the present invention is directed to providing a lateral image processing apparatus of a mirrorless car capable of reducing risk of an accident by recognizing a car in an image captured by a camera and differentiating clarity of the recognized car from a background to easily recognize the car in a short time period even in a display apparatus with a limited size, and a lateral image processing method. Objects of the present invention are not limited to the above described objects, and other objects, which are not is described above, of the present invention may be clearly understood by the following descriptions.

According to an aspect of the present invention, there is provided a lateral image processing method of a mirrorless car, the method including: recognizing areas in which amounts of image change are different from each other in an image captured by a camera; determining whether a car is in a driving state; and converting an image in one area in which an amount of image change is different according to the driving state of the car.

The method may further include adjusting clarity of an image area in which an amount of image change is large in the captured image when the car is in the driving state.

Conversely, the method may further include adjusting clarity of an image area in which an amount of image change is small in the captured image when the car is in a stopped state, The converting of the one image in the one area may include converting the one image such that clarity of one corresponding image area is reduced.

In addition, according to another aspect of the present invention, there is provided a lateral image processing method of a mirrorless car, the method further including: determining whether a rear and lateral car is recognized by a rear and lateral warning apparatus; and emphasizing a boundary line between an area in which an amount of image change is large and an area in which an amount of image change is small in the captured image when the rear and lateral car is recognized.

According to still another aspect of the present invention, there is provided a lateral image processing apparatus of a mirrorless car, the apparatus including: an image capturer configured to capture an image in a lateral and rear direction of the car; an object recognizer is configured to recognize areas in which amounts of image change are different from each other in the captured image; a driving state determination unit configured to determine a driving state of the car from a provided car speed; and an image processor configured to convert an image of one area recognized in the captured image according to the driving state of the car.

The image processor may adjust clarity of an image area in which an amount of image change is large in the captured image when the car is in the driving state, and may adjust clarity of an image area in which an amount of image change is small in the captured image when the car is in a stopped state.

The image processor may convert the image such that clarity of one corresponding image area is reduced.

Meanwhile, according to yet another aspect of the present invention, there is provided a lateral image processing apparatus of a mirrorless car, the apparatus further including a lateral and rear warning determination unit configured to determine whether a rear and lateral car is recognized by a rear and lateral warning apparatus, wherein the image processor may emphasize a boundary line between an area in which an amount of image change is large and an area in which an amount of image change is small in the captured image when the rear and lateral car is recognized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further is understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Advantages and features of the present invention and methods of achieving the same will be clearly understood with reference to the following detailed embodiments along with the accompanying drawings. However, the present invention is not limited to the examples to be disclosed below, but may be implemented in various different forms. The examples are provided in order to fully explain the present invention and fully explain the scope of the present invention for those skilled in the art. The scope of the present invention is defined by the is appended claims. Meanwhile, the terms used herein are provided to only describe embodiments of the present invention and not for purposes of limitation. Unless the context clearly indicates otherwise, the singular forms include the plural forms. It will be understood that the terms "comprise" or "comprising" when used herein, specify some stated components, steps, operations and/or elements, but do not preclude the presence or addition of one or more other components, steps, operations and/or elements.

Figure 1:
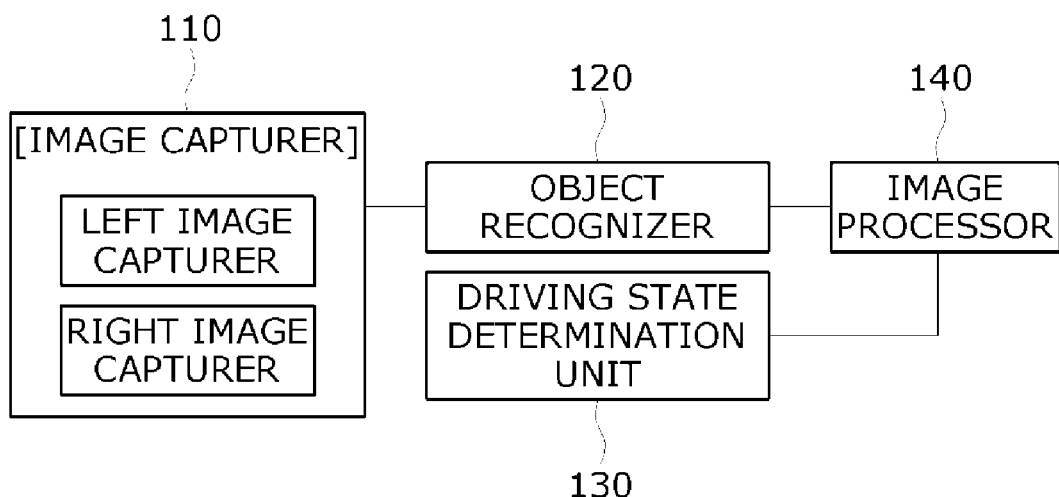
FIG. 1 is a functional block diagram for describing a lateral image processing apparatus of a mirrorless car according to one embodiment of the present invention.

Hereinafter, exemplary embodiments of the present invention will be described with reference to the accompanying drawings in detail. As illustrated in FIG. 1, a lateral image processing apparatus of a mirrorless car according to one embodiment of the present invention includes image capturers 110, an object recognizer 120, a driving state determination unit 130, and an image processor 140.

The image capturers 110 are installed at regions in which car side mirrors are positioned, and serve to capture lateral and rear images.

In addition, the object recognizer 120 serves to recognize areas in which amounts of image change are different from each other.

Figure 2:
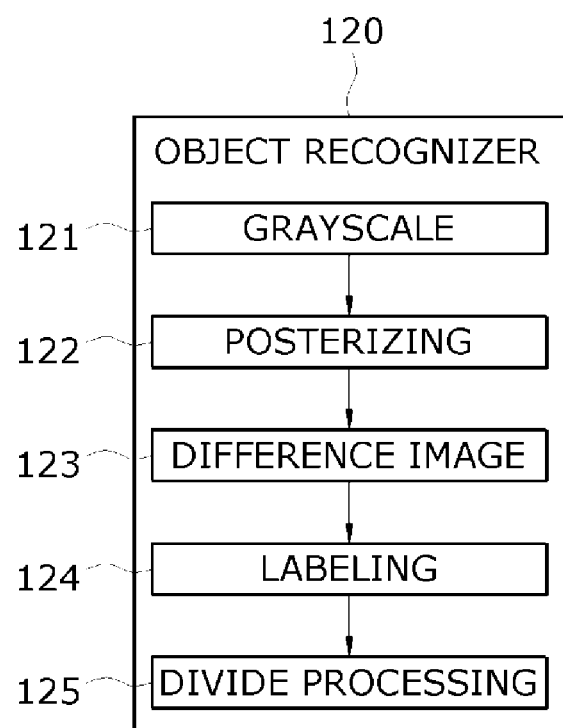
FIG. 2 is a functional block diagram for describing an object recognizer according to one embodiment of the present invention.

Meanwhile, as illustrated in FIG. 2, the object recognizer 120 performs grayscale processing 121 of converting a color image to a black-and-white image, and performs posterizing processing 122 of standardizing by reducing a range of a value that a pixel may have. When a captured image is not a color image, the grayscale processing 121 may not be performed.

Then, the object recognizer 120 performs difference image processing 123 of emphasizing a changed image area, performs labeling processing 124 of analyzing a shape of the image area, and performs dividing processing 125 of dividing an area in which an amount of image change is large from an area in which an amount of image change is small.

Figure 3A:
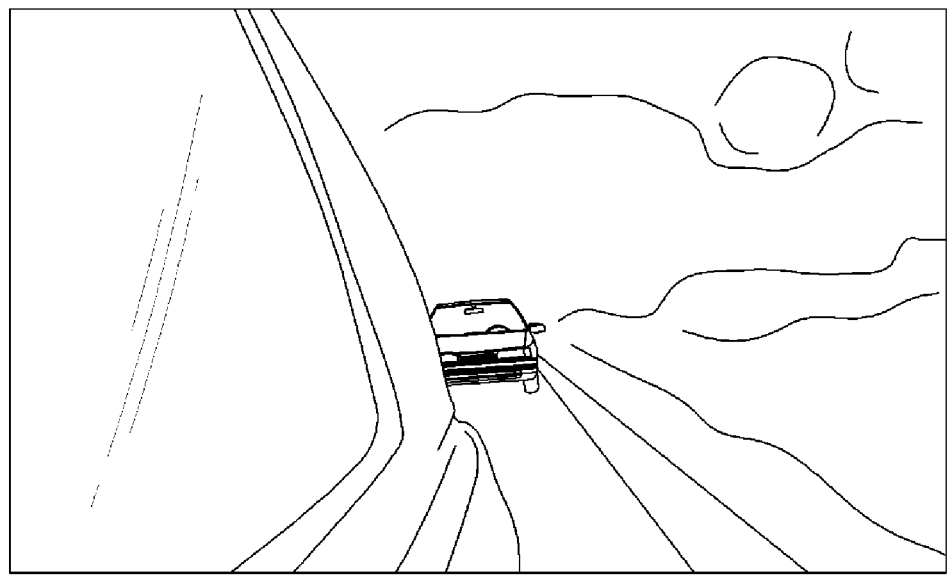
FIGS. 3A, 3B, 3C, and FIG. 3D are reference views for describing an image processor according to one embodiment of the present invention.
Figure 3B:
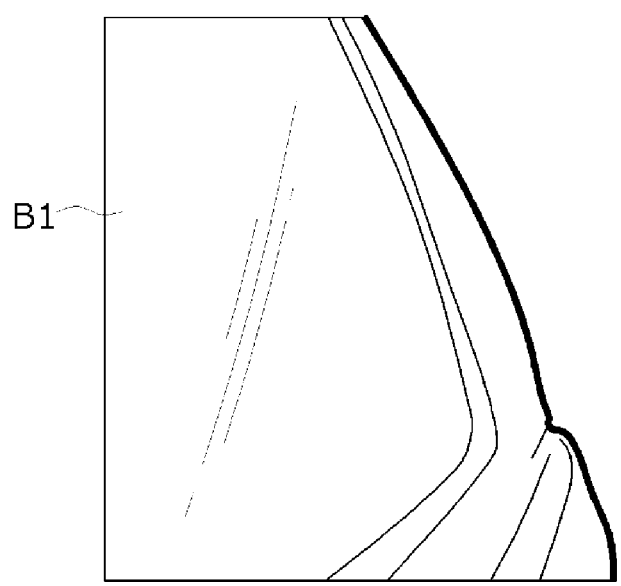

Accordingly, as illustrated in FIG. 3B, the object recognizer 120 may divide an unchanged lateral image B1 of a host car, a background image B2 when the car is driving or stopped, and a rear and lateral car image B3.

Figure 3C:
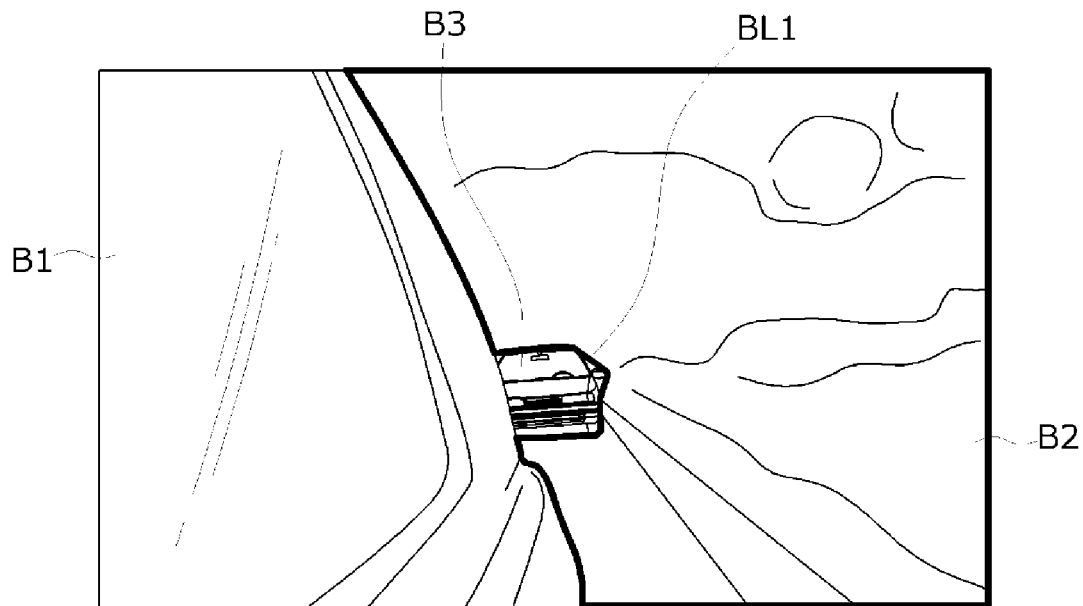

At this moment, as illustrated in FIG. 3C, the object recognizer 120 may determine a basic host car area B1 as a basic host car image, and exclude the basic host car area B1 from the image.

Meanwhile, the driving state determination unit 130 serves to determine a driving state of the car from a provided car speed. In this case, speed information provided by a speed meter of the car may be used as the car speed.

In addition, the image processor 140 serves to convert an image of one area recognized in the captured image according to the driving state of the car.

For example, when the car is in the driving state, the image processor 140 adjusts clarity of an image area in which an amount of image change is large in the captured image. In the present embodiment, a method of reducing clarity of a corresponding area may be used.

Conversely, when the car is in a stopped state, the image processor 140 adjusts clarity of an image area in which an amount of image change is small.

Accordingly, according to one embodiment of the present invention, there is an effect of reducing risk of an accident during travel by processing a background in an image captured by a camera to be dimmed to improve visibility of a target car on a limited display apparatus according to a driving state.

Figure 4:
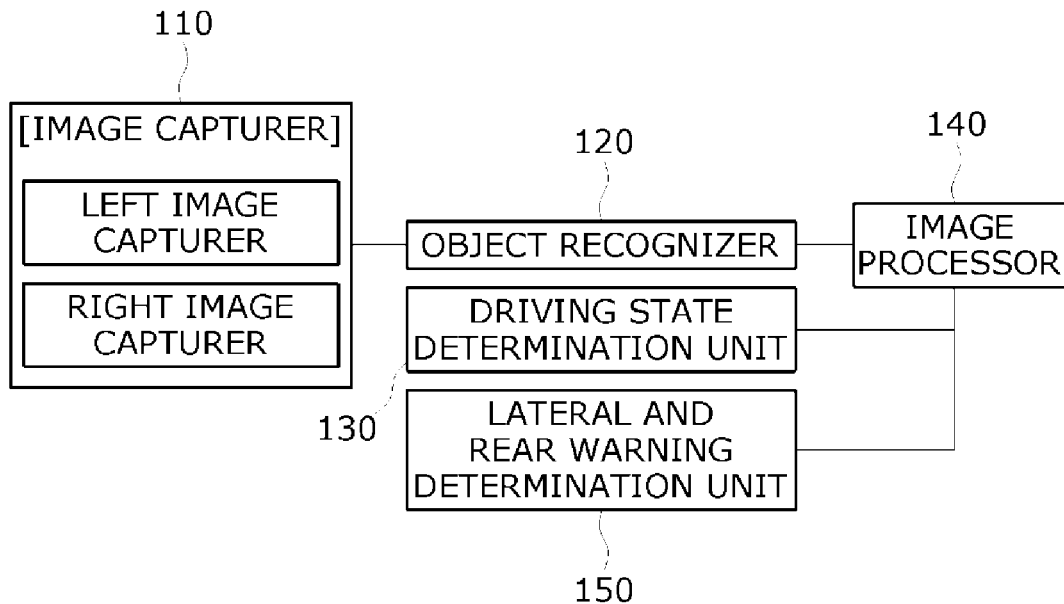
FIG. 4 is a functional block diagram for describing a lateral image processing apparatus of a mirrorless car according to another embodiment of the present invention.

Meanwhile, FIG. 4 is a functional block diagram for describing a lateral image processing apparatus of a mirrorless car according to another embodiment of the present invention.

According to another embodiment of the present invention, as illustrated in FIG. 4, the lateral image processing apparatus of a mirrorless car includes a camera, an object recognizer 120, a driving state determination unit 130, and an image processor 140 according to one embodiment, and further includes a lateral and rear warning determination unit 150 configured to determine whether a rear and lateral car is recognized by a rear and lateral warning apparatus.

When a rear and lateral car is recognized by the lateral and rear warning determination unit 150, the image processor 140 according to another embodiment of the present invention may emphasize a boundary line between an area in which an amount of image change is large and an area in which an amount of image change is small in a captured image.

Accordingly, the object recognizer 120 may display a boundary area having risk of crashing by considering areas in which shapes are analyzed through labeling in conjunction with the lateral and rear warning determination unit 150.

For example, an image capturer 110 provided at a side of the car captures a rear and lateral image from a car. Then, the object recognizer 120 may obtain an image as illustrated in FIG. 3A.

The object recognizer 120 recognizes a basic host car area B1 as a basis from the obtained image as illustrated in FIG. 3B.

Then, when a lateral and rear car is recognized by the lateral and rear warning determination unit 150, the object recognizer 120 excludes the basic host car area B1 from the captured image, and emphasizes a boundary area BL1 in which a shape is analyzed as illustrated in FIG. 3C.

Figure 3D:
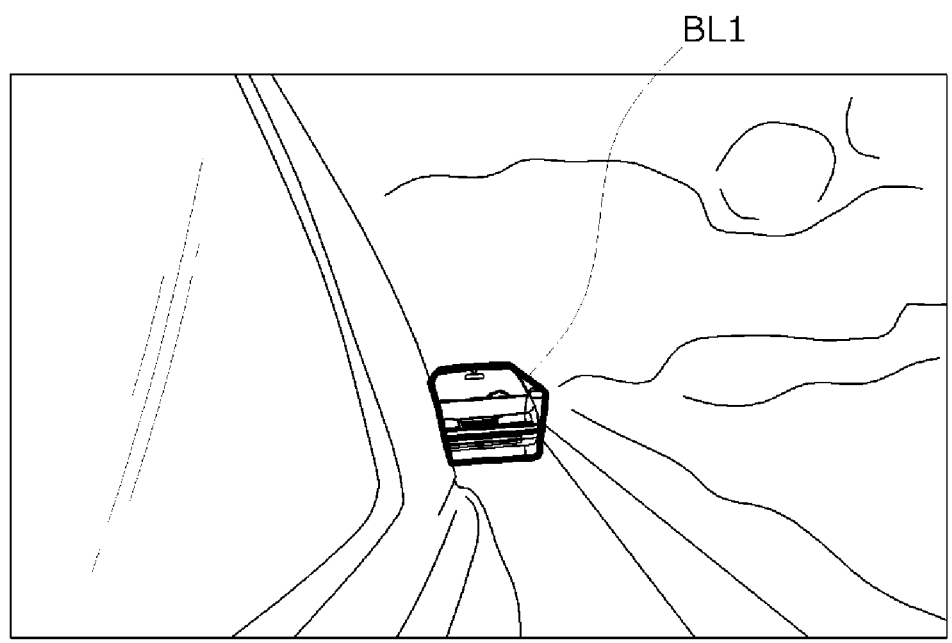

Then, when a rear car or a rear and lateral car is recognized by the lateral and rear warning determination unit 150, the image processor 140 displays an image including the boundary area BL1 emphasized by the object recognizer 120 on a display apparatus as illustrated in FIG. 3D.

Figure 5:
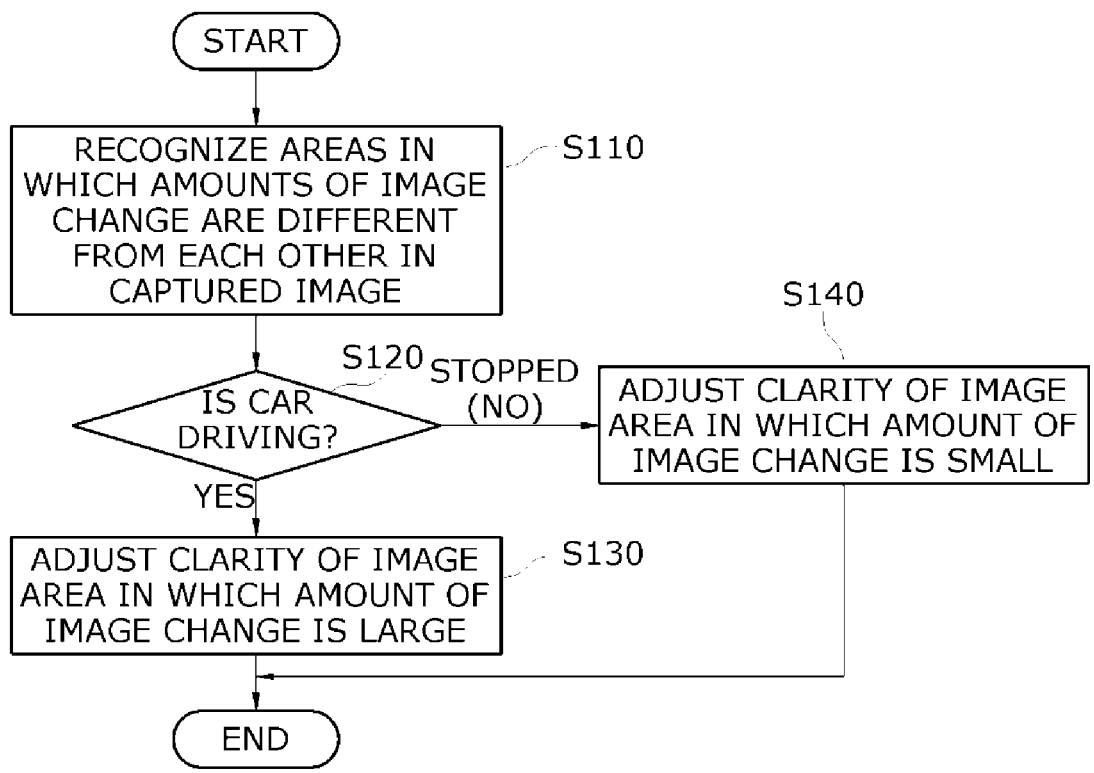
FIG. 5 is a flowchart for describing a lateral image processing method of a mirrorless car according to one embodiment of the present invention.

A lateral image processing method of a mirrorless car according to one embodiment of the present invention will be described with reference to FIG. 5.

First, areas in which amounts of image change are different from each other are recognized in an image captured by a camera (S110).

Then, a driving state of a car is determined (S120).

Then, clarity of one image area in which an amount of image change is different is converted according to the driving state of the car. That is, when the car is in the driving state (YES), clarity of an image area in which an amount of image change is large is adjusted in the captured image. When the car is traveling, an amount of image change of a background is greater than that of a car positioned in a lateral and rear direction. Accordingly, an image, in which the amount of image change is small, of the lateral and rear car is sharpened by reducing image clarity of the background area in the image.

Conversely, when the car is in a stopped state (NO), clarity of an image area in which an amount of image change is small is adjusted in the captured image (S140). That is, in the state in which the car is stopped, since an amount of image change of a background image area is less than an amount of image change of a rear and lateral car, an image of the rear and lateral car may be sharpened by reducing the clarity of the image area in which the amount of image change is small.

According to one embodiment of the present invention, additional image processing may be performed according to presence of a rear and lateral car.

To this end, it is determined whether a car is present in a rear and lateral direction.

When a car is present in the rear and lateral direction (YES), a boundary line between an image area in which an amount of image change is large and an image area in which an amount of image change is small is emphasized in a captured image.

Figure 6:
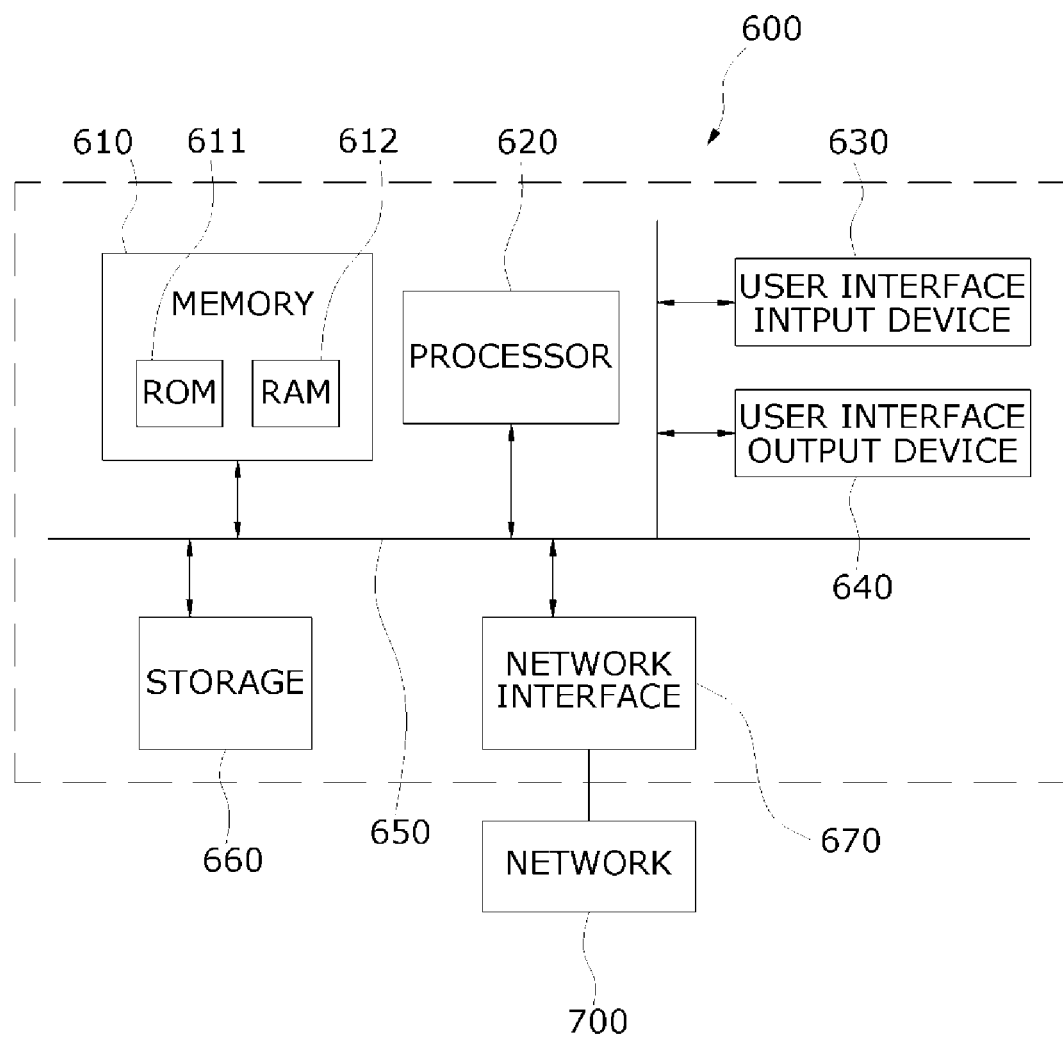
FIG. 6 is a block diagram illustrating a computer system to which the present invention is applied.

FIG. 6 is a block diagram illustrating a computer system to which the present invention is applied.

As shown in FIG. 6, a computer system 600 may include one or more of a memory 610, a processor 620, a user input device 630, a user output device 640, and a storage 660, each of which communicates through a bus 650. The computer system 600 may also include a network interface 670 that is coupled to a network 700. The processor 620 may be a central processing unit (CPU) or a semiconductor device that executes processing instruction stored in the memory 610 and/or the storage 660. The memory 610 and the storage 660 may include various forms of volatile or non-volatile storage media. For example, the memory 610 may include a read-only memory (ROM) 611 and a random access memory (RAM) 612.

According to one embodiment, there is an effect in that it is emphasized and displayed on the display apparatus that the car is present in the rear and lateral direction through the above-described operation in which the boundary line of the image areas is emphasized.

As described above, according to one embodiment of the present invention, there is an effect of reducing risk of an accident during travel by processing a background to be dimmed in an image captured by a camera to improve visibility for a car which should be recognized in a limited display apparatus.

As described above, the configuration of the present invention has been described with reference to the accompanying drawings, but is only an example, and various modifications and alterations may also be made within a range of a technical spirit of the present invention by those skilled in the art. Accordingly, the scope of the invention is not limited by the above-described embodiments, and is defined by the appended claims.

What is claimed is:

1. A lateral image processing method of a mirrorless car, the method comprising the steps of:
    capturing an image in a lateral and rear direction, the image including a portion of a body of the mirrorless car and an object in a surrounding of the mirrorless car by a camera;
    performing a difference image processing and a labeling processing to obtain amounts of image change in the captured image;
    recognizing a first image of the portion of the body of the mirrorless car, a second image of the object in the surrounding of the mirrorless car, and a third image of a background image in the captured image based on the amounts of the image change in the captured image;
    determining whether the mirrorless car is in a driving state; and
    converting the third image of the background image according to the driving state of the mirrorless car.

2. The method of claim 1, further comprising the step of, when the mirrorless car is in the driving state, adjusting clarity of the third image of the background image to improve visibility of the second image of the object in the surrounding of the mirrorless car.

3. The method of claim 1, further comprising the step of, when the mirrorless car is in a stopped state, adjusting clarity of the third image of the background image to improve visibility of the second image of the object in the surrounding of the mirrorless car.

4. The method of claim 1, wherein the step of changing clarity of the third image of the background image further comprises the step of reducing the clarity of the third image of the background image to improve visibility of the second image of the object in the surrounding of the mirrorless car.

5. The method of claim 1, further comprising the steps of:
    determining whether the object is recognized by a rear and lateral warning apparatus; and
    emphasizing a boundary line between the second image of the object in the surrounding of the mirrorless car and the third image of the background image in the captured image according to whether the mirrorless car is in the driving state when the object is recognized.

6. The method of claim 1, wherein: the difference image processing is of emphasizing a changed image area in the captured image, and the labeling processing is of analyzing a shape of the changed image area.

7. The method of claim 1, further comprising the steps of excluding the first image of the portion of the body of the mirrorless car from the captured image.

8. The method of claim 4, wherein the step of further comprising the steps of reducing the clarity of the third image of the background image comprises the step of blurring the third image of the background image.

9. A lateral image processing apparatus of a mirrorless car, the apparatus comprising:
    an image capturer configured to capture an image in a lateral and rear direction, the image including a portion of a body of the mirrorless car and an object in a surrounding of the mirrorless car;
    an object recognizer configured to perform a difference image processing and a labeling processing to obtain amounts of image change in the captured image and to recognize a first image of the portion of the body the mirrorless car, a second image of the object in the surrounding of the mirrorless car, and a third image of a background image in the captured image based on the amounts of the image change in the captured image;

a driving state determinator configured to determine a driving state of the mirrorless car; and an image processor configured to convert the third image of the background image according to the driving state of the mirrorless car.

10. The apparatus of claim 9, wherein the image processor is configured to adjust clarity of the third image of the background image to improve visibility of the second image of the object in the surrounding of the mirrorless car.

11. The apparatus of claim 9, wherein the image processor is configured to adjust clarity of the third image of the background image to improve visibility of the second image of the object in the surrounding of the mirrorless car.

12. The apparatus of claim 9, wherein the image processor is configured to reduce clarity of the third image of the background image to improve visibility of the second image of the object in the surrounding of the mirrorless car.

13. The apparatus of claim 9, further comprising a lateral and rear warning determination unit configured to determine whether the object in the surrounding of the mirrorless car is recognized by a rear and lateral warning apparatus, wherein the image processor is configured to emphasize a boundary line between the second image of the object in the surrounding of the mirrorless car and the third image of the background image in the captured image according to whether the object in the surrounding of the mirrorless car is moving when the object in the surrounding of the mirrorless car is recognized.

14. The apparatus of claim 9, further wherein: the difference image processing is of emphasizing a changed image area in the captured image, and the labeling processing is of analyzing a shape of the changed image area.

15. The apparatus of claim 9, further comprising the steps of excluding the first image of the portion of the body of the mirrorless car from the captured image.

16. The apparatus of claim 12, wherein the image processor is configured to blur the third image of the background image.

* * * * *